US008308280B2

(12) United States Patent
Enomoto

(10) Patent No.: US 8,308,280 B2
(45) Date of Patent: Nov. 13, 2012

(54) INKJET RECORDING HEAD AND MANUFACTURING METHOD THEREOF

(75) Inventor: Takanori Enomoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 998 days.

(21) Appl. No.: 12/126,578

(22) Filed: May 23, 2008

(65) Prior Publication Data

US 2008/0291248 A1 Nov. 27, 2008

(30) Foreign Application Priority Data

May 24, 2007 (JP) ................................ 2007-137948

(51) Int. Cl.

| | |
|---|---|
| ***B41J 2/04*** | (2006.01) |
| ***B41J 2/175*** | (2006.01) |
| ***B21D 53/76*** | (2006.01) |
| ***B23P 17/00*** | (2006.01) |

(52) U.S. Cl. ............................ 347/87; 347/54; 29/890.1

(58) Field of Classification Search .................... 347/54; 29/890.1

See application file for complete search history.

(56) References Cited

U.S. PATENT DOCUMENTS

| | | | | |
|---|---|---|---|---|
| 6,257,703 | B1 | 7/2001 | Hirosawa | |
| 6,474,790 | B2 * | 11/2002 | Kaneko | 347/59 |
| 2006/0139419 | A1 * | 6/2006 | Shigemura | 347/85 |
| 2007/0109390 | A1 * | 5/2007 | Yamakami et al. | 347/105 |

* cited by examiner

*Primary Examiner* — Matthew Luu
*Assistant Examiner* — Renee I Wilson
(74) *Attorney, Agent, or Firm* — Canon USA Inc IP Division

(57) ABSTRACT

An inkjet recording head, wherein a support member being formed by at least two layers is provided between an ink supply member and a recording element substrate having a substrate, which includes discharge ports to discharge ink and an energy generating element to generate energy to discharge the ink from the discharge ports.

7 Claims, 7 Drawing Sheets

INKJET RECORDING HEAD AND MANUFACTURING METHOD THEREOF

BACKGROUND OF THE INVENTION

1. Field of the Invention

The present invention relates to an inkjet recording head to be mounted on an inkjet recording apparatus used in inkjet recording systems, and also relates to a method for manufacturing the inkjet recording head.

2. Description of the Related Art

An inkjet recording head (hereinafter referred to as a recording head) includes a substrate having at least a plurality of discharge ports, a flow path communicating with the discharge ports, a supply port configured to supply ink to the flow path, and an energy generating element to impart discharge energy to the ink in the flow path. The inkjet recording head further includes a support member to support the substrate and an ink-supply-path forming member to supply ink to the substrate. In the substrate, a Si (silicon) substrate is normally used. The ink-supply-path forming member is made of plastic, for example.

Heretofore, the inkjet recording apparatus described above has had a problem that the recording element substrate would suffer warpage or distortion due to an increase in stress at the joint interface caused by a difference in linear expansion coefficient between the ink supply member containing the liquid and the recording element substrate including the energy generating element for discharging a liquid from the discharge ports.

This phenomenon is described with reference to FIG. 4. FIG. 4 illustrates the inkjet recording head including a recording element substrate 41 and an ink supply member 42. The recording element substrate 41 is made of a material with a linear expansion coefficient of not more than 5 ppm, whereas the ink supply member 42 is made of a material with a higher linear expansion coefficient of 20 ppm or more. Accordingly, there is a difference in linear expansion coefficient between the recording element substrate 41 and the ink supply member 42. The recording element substrate 41 is fixed to the ink supply member 42 with an adhesive.

When printing is carried out by an inkjet recording head according to the configuration illustrated in FIG. 4, due to temperature rise during printing, thermal stress occurs at the joint interface between the recording element substrate 41 and the ink supply member 42, which gives rise to a deformation of the recording element substrate 41 and has a bad influence on print quality.

As a way of solving the above problem, U.S. Pat. No. 6,257,703 describes a configuration in which a support member having the linear expansion coefficient equal to the recording element substrate, is located between the recording element substrate and the ink supply member.

However, recently, there is increasing requirement that recorded images have high resolutions and the effect on images stemming from a deformation of the recording element substrate should be minimized. Therefore, it has become necessary to further reduce the stress caused by a difference in linear expansion coefficient between the ink supply member and the substrate.

SUMMARY OF THE INVENTION

The present invention is directed to an inkjet recording head which has reduced warpage or deformation of the recording element substrate and also directed to a method for manufacturing the recording head.

According to an aspect of the present invention, an ink recording head includes a recording element substrate. The recording element substrate includes discharge ports facilitating discharging ink and a substrate provided with an energy generating element configured to generate energy to discharge ink through the discharge ports. The ink recording head also includes an ink supply member configured to supply ink to the recording element substrate and a support member provided between the ink supply member and the recording element substrate. The support member is formed by at least two layers. When the linear expansion coefficient of the ink supply member is denoted by $\alpha$, the linear expansion coefficient of the recording element substrate is denoted by $\beta$, and the linear expansion coefficient of the support member's n-th layer from the recording element substrate is denoted by $\gamma_n$, then the condition of $\alpha>\gamma_n> \ldots >\gamma_1>\beta$ is satisfied, where n is an integer equal to or larger than 2.

According to an exemplary embodiment of the present invention, the stress caused by a difference in linear expansion coefficient that appears between the recording element substrate and the ink supply member can be reduced. The reduction of the stress prevents warpage or distortion of the recording element substrate, or prevents ink leakage resulting from peeling-off of the substrate from the ink supply member. Therefore, an inkjet recording head capable of high-speed printing with high print quality and a method for manufacturing the inkjet recording head can be provided.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

The inkjet recording head (recording head) can be mounted on devices, such as printers, copying machines, facsimiles provided with a communication system, word processors equipped with a printer unit, and can also be mounted on a multifunctional industrial recording apparatus combined with various processors.

The recording head enables performing recording on various recording media, such as paper, threads, fiber, woven fabrics, leather, metal, plastics, glass, timber, and ceramics. The word "recording" used in this specification applies not only to recording of meaningful images, such as characters and graphics on the recording medium, but also to recording of meaningless images, such as random patterns.

Furthermore, the word "ink" should be interpreted in a wide sense, that is, the ink is a liquid which is applied to a recording medium to form an image, a design, or a pattern, or to work upon a recording medium, or to process the ink or the recording medium. Here, the processes performed on the ink or the recording medium include achieving higher fixability of the ink by solidification or insolubilization of the color materials in the ink applied to the recording media, better print quality and coloring property, and long-term image permanence, for example.

Figure 1A:
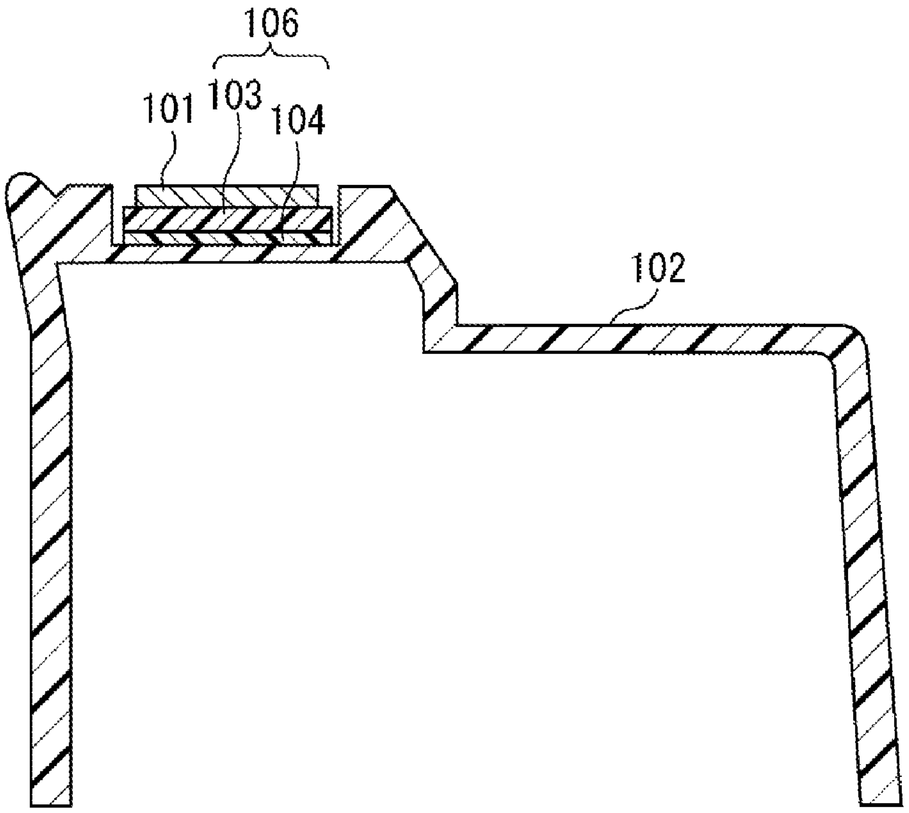
FIGS. 1A and 1B are sectional views of the inkjet recording head according to an exemplary embodiment of the present invention.
Figure 1B:
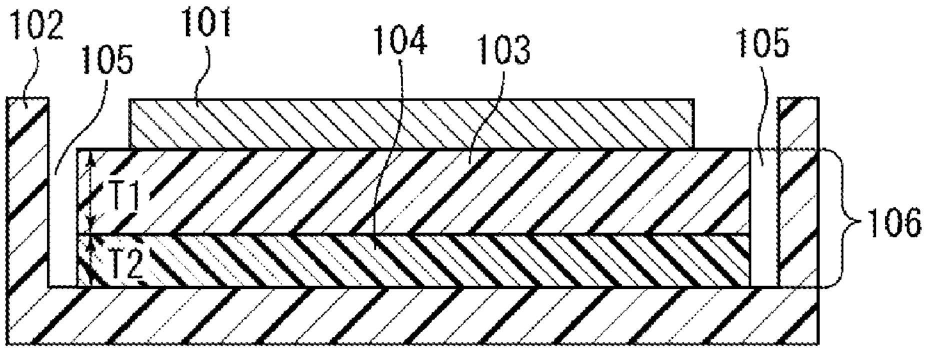
Figure 2:
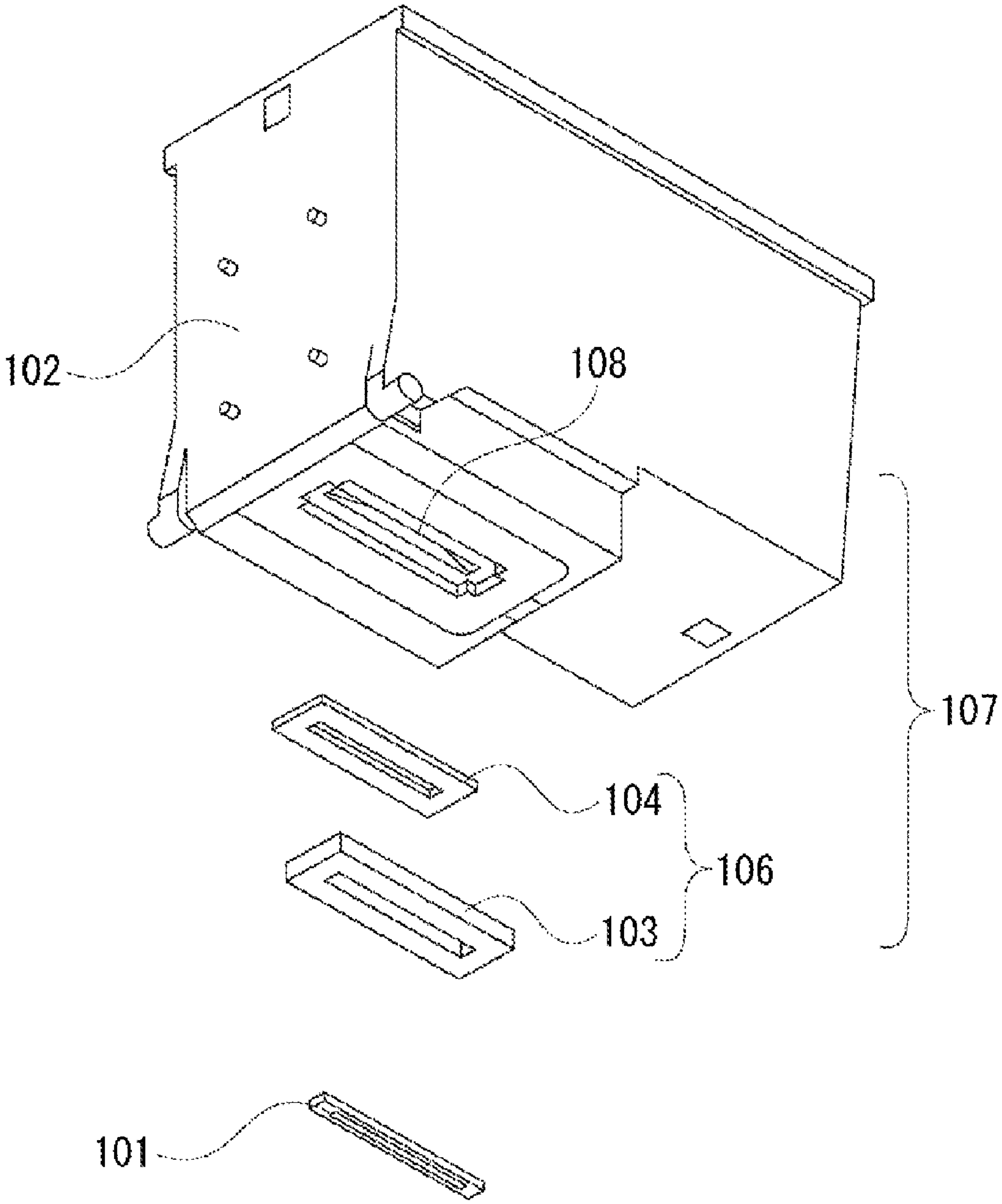
FIG. 2 is an exploded view illustrating the inkjet recording head in its disassembled state according to an exemplary embodiment of the present invention.

The structure of the inkjet recording head according to the exemplary embodiment of the present invention is described with reference to FIGS. 1A, 1B, and 2. FIG. 1A is a schematic sectional view of the inkjet recording head according to the exemplary embodiment. FIG. 1B is an enlarged schematic view of a portion of the recording head, which includes the recording element substrate in FIG. 1A. FIG. 2 is an exploded view illustrating the inkjet recording head in its disassembled state according to the exemplary embodiment.

Figure 5A:
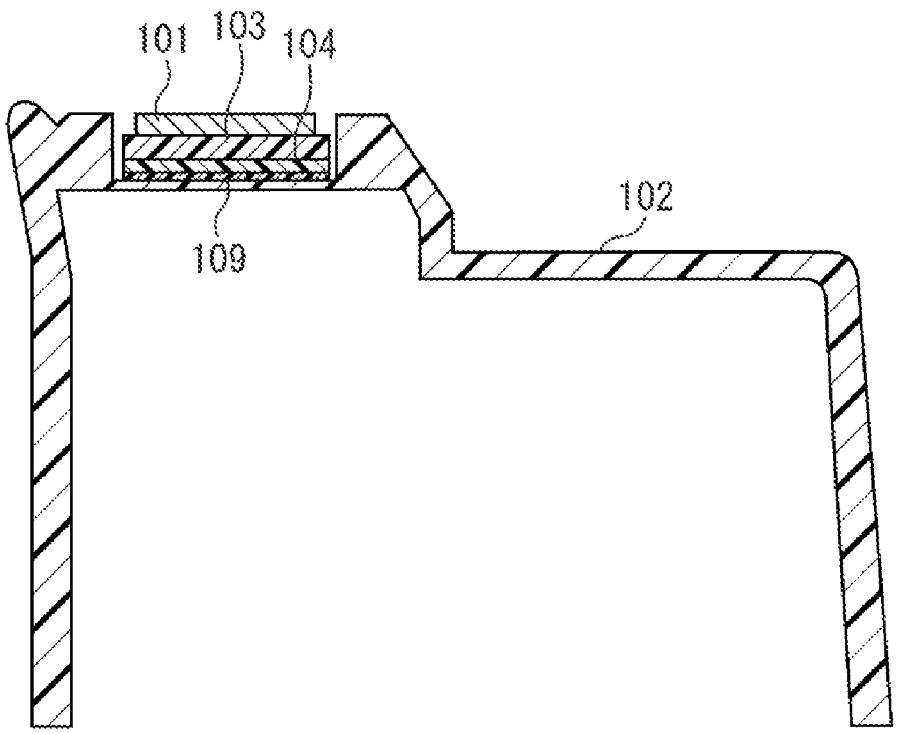
FIGS. 5A and 5B are sectional views of the inkjet recording head according to an exemplary embodiment of the present invention.
Figure 5B:
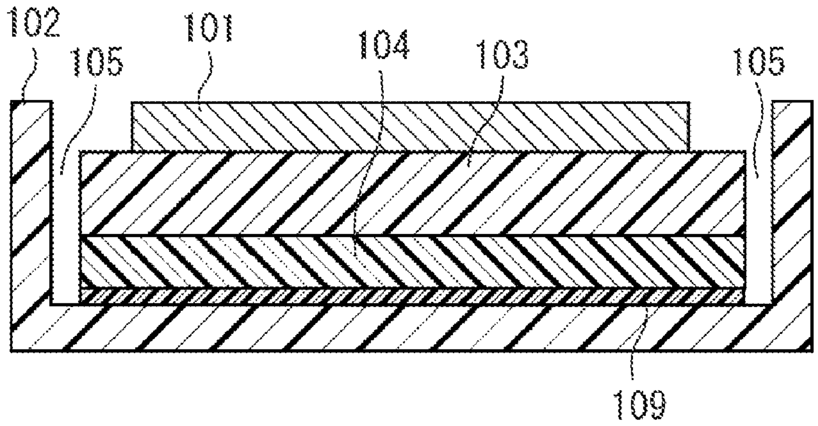

A support member 106 is provided between a recording element substrate 101 having an energy generating element to discharge ink from the discharge ports and an ink supply member 102 containing ink to be supplied to the recording element substrate 101. The support member 106 has a first layer 103 joined to the recording element substrate 101, and a second layer 104 that is joined to the first layer 103 of the support member and to the ink supply member 102. In the present embodiment, by providing the support member 106 between the recording element substrate 101 and the ink supply member 102, the stress caused by a difference in linear expansion coefficient between the ink supply member 102 and the recording element substrate 101 can be reduced. The linear expansion coefficient $T_1$ of the first layer 103 is smaller than the linear expansion coefficient $T_2$ of the second layer 104. In the present embodiment, as an example, the support member 106 is formed by two layers. As illustrated in FIGS. 5A and 5B, the support member 106 may include a third layer 109. Moreover, the support member 106 may be formed by further adding fourth and fifth layers. As long as the layer closer to the recording element substrate 101 has the smaller linear expansion coefficient, the support member is not limited to these numbers of layers.

When the linear expansion coefficient of the ink supply member 102 is denoted by $\alpha$, the linear expansion coefficient of the recording element substrate 101 is denoted by $\beta$, the linear expansion coefficient of the first layer 103 of the support member 106 is denoted by $\gamma_1$, and the linear expansion coefficient of the second layer 104 of the support member 106 is denoted by $\gamma_2$, the condition of $\alpha>\gamma_2>\gamma_1>\beta$ is satisfied. When the linear expansion coefficient of the support member's n-th layer from the recording element substrate 101 (n is an integer of two or more) is denoted by $\gamma_n$, the condition of $\alpha>\gamma_n> \ldots >\gamma_1>\beta$ holds.

If the thickness of the first layer 103 is designated as $T_1$ and the thickness of the second layer 104 is designated as $T_2$, it is desirable that the condition of $T_1>T_2$ is satisfied. If the thickness of the support member's n-th layer from the recording element substrate side 101 is designated as $T_n$ (n is an integer of 2 or more), $T_1> \ldots >T_n$ holds.

By the above-described arrangement, the stress caused by a difference in linear expansion coefficient between the ink supply member 102 and the recording element substrate 101 can be alleviated. It is desirable that the respective layers of the support member 106 are integrally formed as one body.

The support member 106 and the ink supply member 102 can be formed in one body. In that case, the support member 106 and the ink supply member 102 can be distinguished by different chemical compositions of the materials, for example.

The support member 106 and the ink supply member 102 are collectively referred to as an ink supply joint portion 107. Further, the ink supply member 102 includes an ink supply port 108. In FIG. 2, the ink supply member 102 also serves as an ink storage member for storing ink.

A gap 105 is provided between the support member 106 and the ink supply member 102. The gap 105 serves to reduce a direct stress load to the side faces of the support member 106 from the ink supply member 102. However, depending on a combination of materials used in the first and second layers 103 and 104 of the support member 106, a structure without the gap 105 may be adopted.

As a way of joining the recording element substrate 101 and the support member 106 together, instead of bonding with an adhesive, a joining method without using an adhesive may be adopted. When an adhesive is used, for example, an epoxy resin may be chosen. However, a material for the adhesive is not limited.

Figure 3:
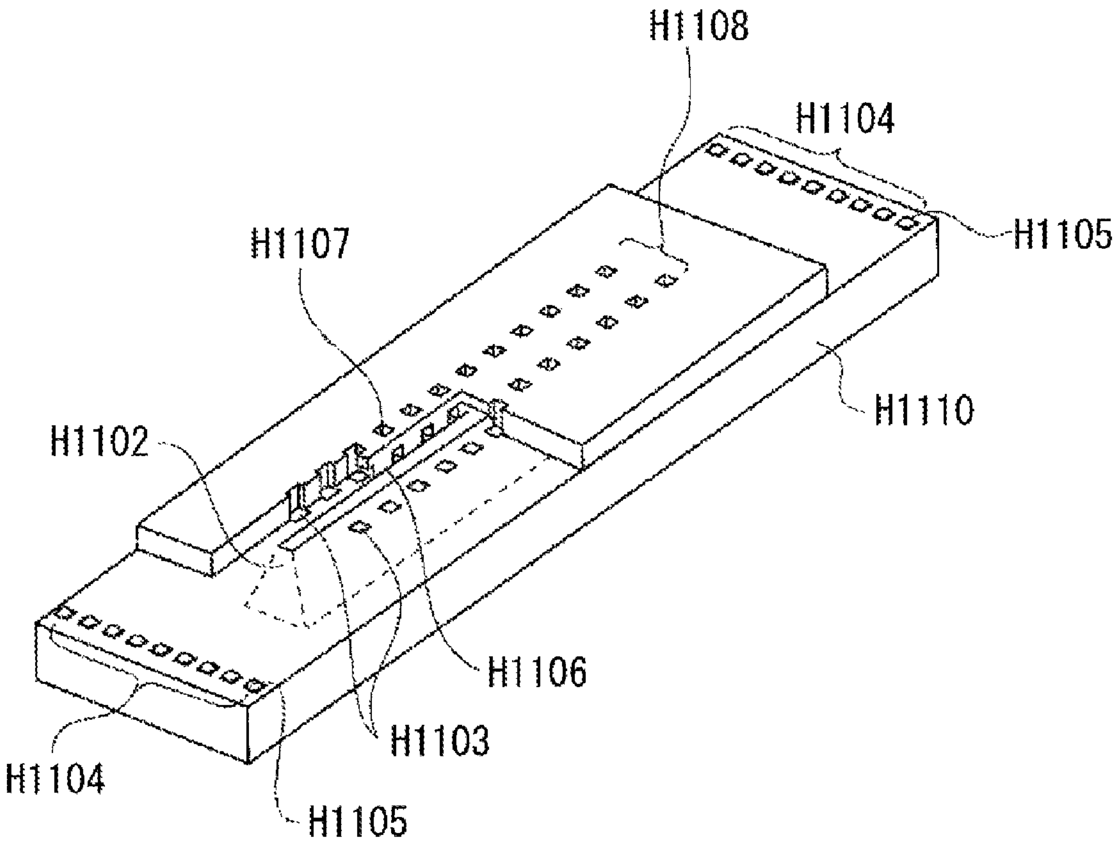
FIG. 3 illustrates the recording element substrate according to an exemplary embodiment of the present invention.
Figure 4:
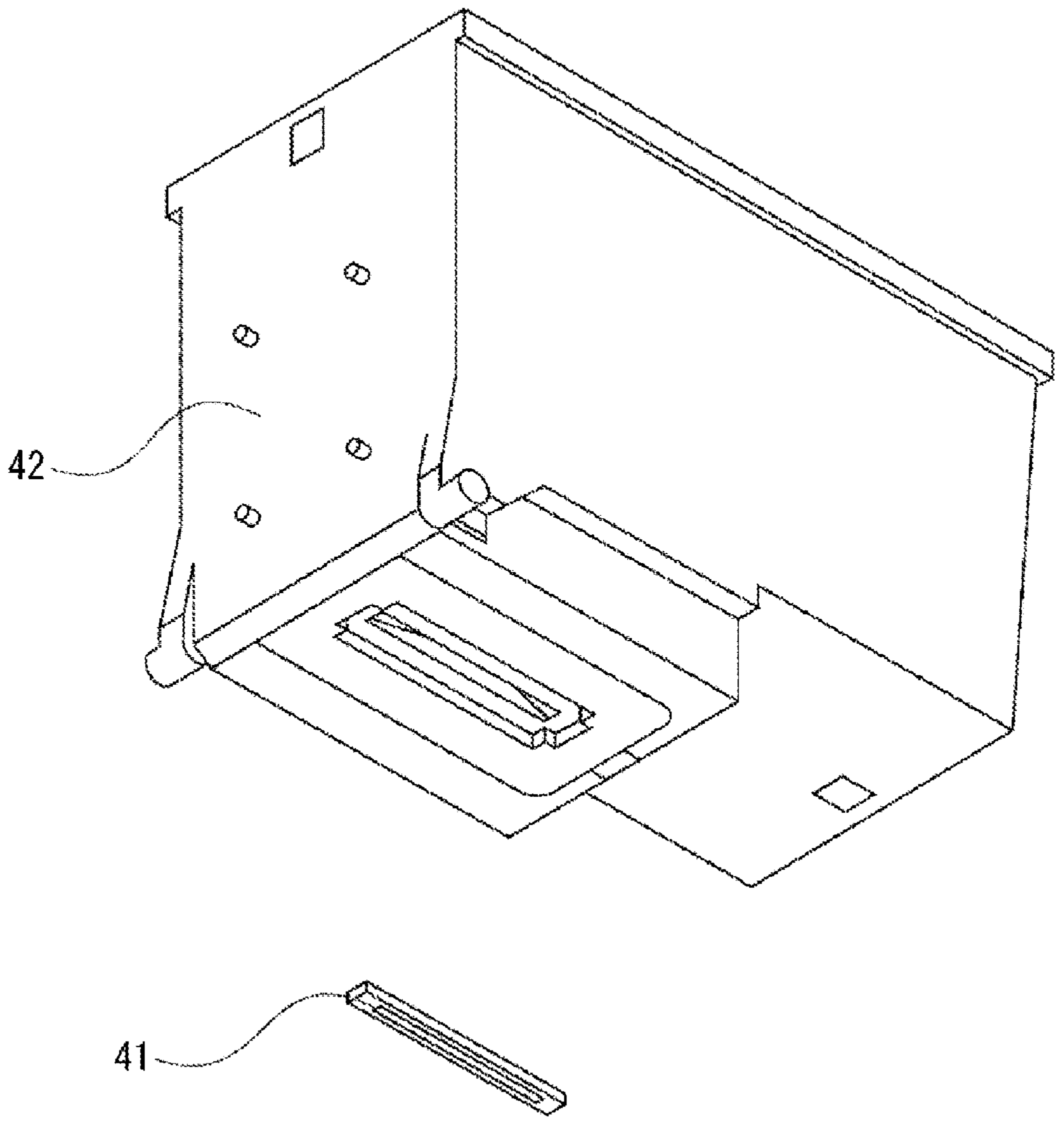
FIG. 4 PRIOR ART
FIG. 4 is an exploded view illustrating a conventional inkjet recording head in its disassembled state.

The recording element substrate in the present embodiment is described by referring to FIG. 3. FIG. 3 is a schematic diagram of the recording element substrate. The size of the recording element substrate in this exemplary embodiment is 2-3 mm in width, 25-35 mm in length (discharge-port direction), and 0.5-0.8 mm in thickness. The recording element substrate includes discharge ports H1107 to discharge ink, which are arranged as illustrated in FIG. 3. The recording element substrate is bonded and fixed using an adhesive. An ink supply port H1102 of the recording element substrate is located at a position to communicate with the ink supply port of the first layer of the support member. Further, in FIG. 3, the recording element substrate includes electrothermal transducers H1103, an electrode portion H1104, bumps H1105, an ink flow path wall H1106, discharge ports H1108, and a substrate H1110 made of Si, for example.

With regard to the members used in the present embodiment, their materials are described as follows.

For the material of the first layer 103 of the support member 106, a material with a linear expansion coefficient of 1 to 10 ppm, for example, is desirably adopted which is close to the linear expansion coefficient of 3 ppm of Si used for the recording element substrate 101. Among organic materials of 1-10 ppm class, there are a polyphenylene sulfide (PPS), and a modified polyphenylene ether (PPE), each containing filler. Further, as the other organic materials of the same class, there are polyethylene terephthalate (PET), polypropylene (PP), polysulfone (PSU), thermoplastic resins such as liquid crystalline polymer, and thermosetting resins such as epoxy resin. The fillers here include inorganic fillers, and the inorganic fillers include $SiO_2$, carbon, graphite, etc. For the inorganic materials of 1-10 ppm class, ceramic materials can be adopted, which contain $Al_2O_3$ (alumina), $ZrO_2$ (zirconia), $Si_3N_4$ (silicon nitride), SiC (silicon carbide), or AlN (aluminum nitride). In addition, a glass material containing $SiO_2$, and metal materials such as a super invar, SUS316, or Cu can be adopted.

For a material forming the second layer 104 of the support member 106, a material with a linear expansion coefficient between the linear expansion coefficients of the first layer 103 and the ink supply member 102, such as, a material of about 20-30 ppm class is desirable. If the material of the first layer 103 contains the filler, a material that contains less filler than the material of the first layer 103 can also be used in the second layer 104. Further, in the second layer 104, a material that has the same composition as the ink supply member 102 but contains a different amount of the filler from the ink supply member 102 can also be used.

When materials for the first layer 103 and the second layer 104 are selected to match the required linear expansion coefficients as described above, the thickness of the second layer 104 is desired to be thinner than the thickness of the first layer 103. In this manner, the amount of deformation that occurs in the first layer 103 can be reduced.

Further, for the material that forms the ink supply member 102, a material containing filler with an addition rate of the filler as small as possible is preferred, and a material with a content rate of the filler that is held down to 20 percent or less is desirable. For the material of the ink supply member 102, if chemical resistance and heat resistance are weighed heavily, a modified PPF or a PSU can be selected. If emphasis is placed on gas barrier property, a PP or PET can be selected.

Next, a method for manufacturing an inkjet recording head according to the present exemplary embodiment is described.

Figure 7A:
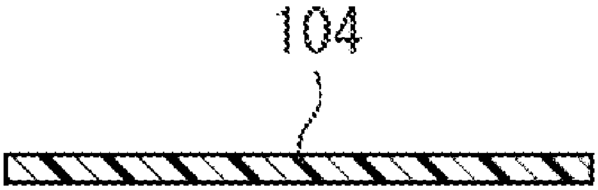
FIGS. 7A and 7B are sectional views illustrating examples of the method of manufacturing the inkjet recording head according to an exemplary embodiment of the present invention.
Figure 7B:
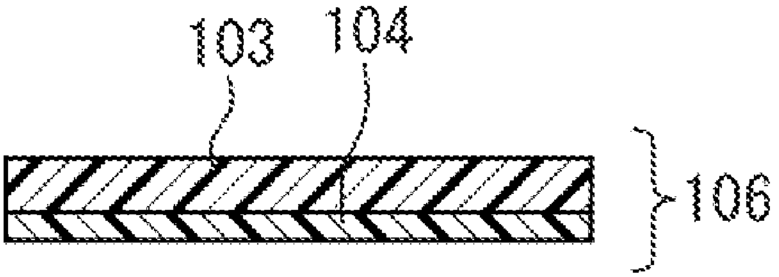

To produce the support member 106 that is formed as a jointed body of the first layer 103 and the second layer 104, there is an insert-forming method as illustrated in FIGS. 7A and 7B. As illustrated in FIG. 7A, a second layer 104 formed by using a first mold is inserted into a second mold. After this process, a resin used in forming the first layer 103 is poured into the second mold as shown in FIG. 7B. Thus, the support member 106 is obtained.

If the support member 106 is formed by a resin, such as PPS, to which carbon filler or glass filler is added, a two-color forming method can be used to form the support member 106. More specifically, to take an example, in the method for forming a support member 106, primary forming is performed in which the second layer 104 of the support member is formed, then secondary forming is performed in which the first layer 103 of the support member is formed to obtain a support member 106.

The ink supply joint portion 107 is manufactured by forming the support member 106 and the ink supply member in a single piece. An example of this method is described by referring to FIGS. 6A to 6C.

Figure 6A:
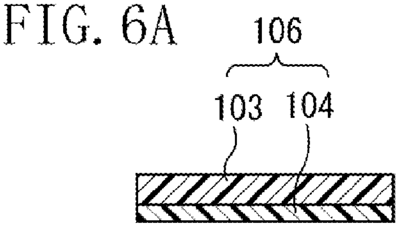
FIGS. 6A-6C are sectional views illustrating examples of the method of manufacturing the inkjet recording head according to an exemplary embodiment of the present invention.
Figure 6B:
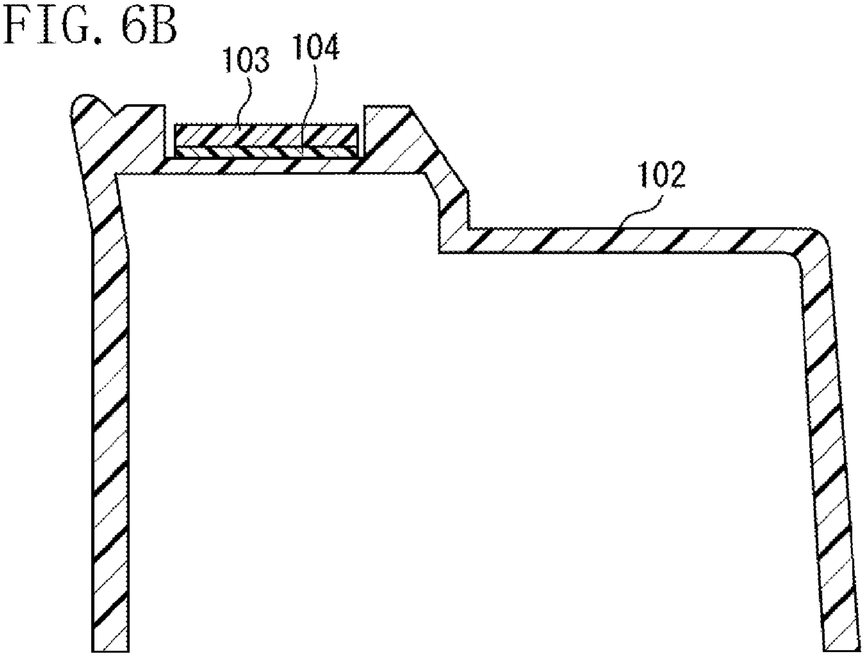

As illustrated in FIG. 6A, a support member 106 is arranged. Then, the support member 106 is fixedly set in a mold configured to form an ink supply member 102, and the joint portion is formed in which support member 106 is integrated with the ink supply member 102. At this time, a resin used in forming an ink supply member arrives at the support member 106. As the interfaces melt, the support member 106 and the ink supply member 102 are joined together and are in a state illustrated in FIG. 6B.

Thus, the support member 106 and the ink supply member 102 are formed into a single piece without using an adhesive.

Figure 6C:
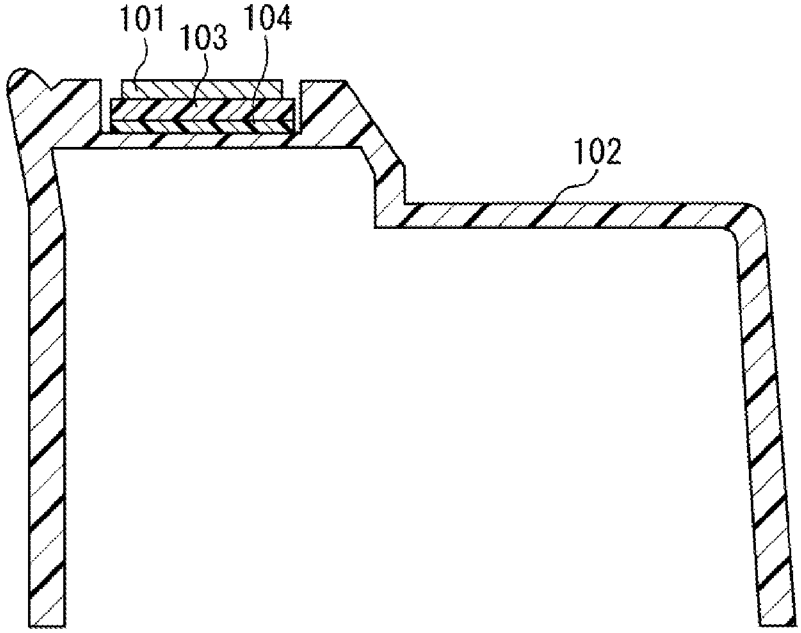

As illustrated in FIG. 6C, the recording element substrate 101 is fixed so as to be supported on the support member 106 with an adhesive. Since the adhesive is 0.05 mm to 0.1 mm, thinner compared with the other members and low in coefficient of elasticity, the adhesive causes less thermal stress than the thermal stress caused by the ink supply member 102. Therefore, the effect of the adhesive on the recording element substrate 101 is relatively small and is not a problem here.

EXAMPLE 1

The recording head in Example 1 is described as follows. The recording head in this Example has a configuration as illustrated in FIGS. 1A, 1B, and 2. As the substrate H1110, a recording element 101 made of silicon (Si) is used. The linear expansion of the recording element substrate 101 is 3 ppm.

For the material of the first layer 103 of the support member 106, a PPS to which 60 weight percent filler is added is used. At this time, the linear expansion coefficient of the first layer 103 is 5 ppm in the MD direction (the resin flow direction).

For the second layer 104 of the support member 106, a modified PPE (PCN2910 (by GE Plastics) to which filler is added is used. The linear expansion coefficient of this material is 21 ppm in the MD direction.

On the other hand, for the material of the ink supply member 102, a modified PPE (SE1X (by GE Plastics)) is used. The linear expansion coefficient of the modified PPE is 60 ppm. This value is constant over the whole ink supply member.

The first layer 103 of the support member 106 is a rectangular type and 2 mm in thickness. The second layer 104 of the support member 106 is 0.3 mm in thickness.

EXAMPLE 2

The recording head in Example 2 is described as follows.

The recording element substrate 101 mainly includes silicon (Si) and its linear expansion coefficient is 3 ppm. The recording element substrate 101 in the present Example has the same configuration as in Example 1.

For the material of the first layer 103 of the support member 106, Alumina-476 by Kyocera Corporation is used. The linear expansion coefficient of Alumina-476 is 7 ppm.

For the material of the second layer 104 of the support member 106, a modified PPE (PCN2910 (by GE Plastics)) to which filler is added is used. The linear expansion coefficient of the modified PPE is 25 ppm.

On the other hand, for the material of the ink supply member 102, a modified PPE is used. The linear expansion coefficient of this material is 60 ppm.

Other features are the same as in Example 1.

COMPARATIVE EXAMPLE

A difference of a comparative Example 1 from Example 1 is that in the comparative Example, the support member does not include the second layer. As in Example 1, for the first layer of the support member in the comparative Example, a PPS to which filler is added is used. The linear expansion coefficient of the first layer is 5 ppm. Other configuration is the same as in Example 1.

A plurality of recording heads were prepared for Example 1, Example 2, and the comparative Example, and the recording heads were tested in high-temperature and low-temperature environments. The Examples were also subjected to impact tests.

In those tests, the recording heads of Example 1 and Example 2 did not suffer any deformation. On the other hand, in some of the recording heads used in the comparative Example, peeling-off appeared between the ink supply member and the recording element substrate.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-137948 filed May 24, 2007, which is hereby incorporated by reference herein in its entirety.

What is claimed is:

1. An inkjet recording head comprising:

a recording element substrate including discharge ports facilitating discharging ink and a substrate provided with an energy generating element configured to generate energy to discharge ink through the discharge ports;

an ink supply member configured to supply ink to the recording element substrate; and a support member provided between the ink supply member and the recording element substrate, the support member having at least two laminated layers, the at least two laminated layers being arranged between the ink supply member and the recording element and laminated in a direction along the ink supply member and the recording element substrate, wherein when the linear expansion coefficient of the ink supply member is denoted by $\alpha$, the linear expansion coefficient of the recording element substrate is denoted by $\beta$, and the linear expansion coefficient of the support member's n-th layer, in which n is an integer equal to or larger than 2, from the recording element substrate is denoted by $\gamma_n$, the condition of $\alpha>\gamma_n> \ldots \gamma_1>\beta$ is satisfied.

2. The inkjet recording head according to claim 1, wherein when the thickness of the support member's n-th layer, in which n is an integer equal to or larger than 2, from the recording element substrate is $T_n$, the condition of $T_1> \ldots >T_n$ is satisfied.

3. The inkjet recording head according to claim 1, wherein at least one layer of the support member includes a polyphenylene sulfide and filler.

4. The inkjet recording head according to claim 1, wherein at least one layer of the support member includes a modified polyphenylene ether and filler.

5. The inkjet recording head according to claim 1, wherein the ink supply member is formed integrally with an ink storage member that contains ink and the support member is formed integrally with the ink supply member.

6. The inkjet recording head according to claim 1, wherein the ink supply member is formed by a resin and the substrate is formed by silicon (Si).

7. The inkjet recording head according to claim 1, wherein the support member and the recording element substrate are joined together with an adhesive.

* * * * *